United States Patent [19]
Pinsley et al.

[11] 3,761,836
[45] Sept. 25, 1973

[54] MAGNETICALLY COMPENSATED CROSS FIELD FLOWING GAS LASER

[75] Inventors: Edward A. Pinsley, North Palm Beach, Fla.; Albert W. Angelbeck, East Hartford; Carl J. Buczek, Manchester, both of Conn.

[73] Assignee: United Aircraft Corporation, East Hartford, Conn.

[22] Filed: Jan. 7, 1972

[21] Appl. No.: 216,302

Related U.S. Application Data

[63] Continuation of Ser. No. 877,320, Nov. 17, 1969, abandoned.

[52] U.S. Cl. ............................... 331/94.5, 330/4.3
[51] Int. Cl. ........................... H01s 3/22, H01s 3/09
[58] Field of Search ................... 331/94.5; 330/4.3; 315/39.71

[56] References Cited
UNITED STATES PATENTS

| 3,514,714 | 5/1970 | Angelbeck | 331/94.5 |
| 3,577,096 | 5/1971 | Bridges et al. | 331/94.5 |

*Primary Examiner*—David Schonberg
*Assistant Examiner*—R. J. Webster
*Attorney*—Anthony J. Criso

[57] ABSTRACT

A flowing gas laser having an electric discharge plasma with the electric field oriented transversely with respect to the flow of gases therethrough is provided with a magnetic field which is oriented transversely with respect to both the flow and the electric field to overcome the forces of flowing gases thereon.

2 Claims, 1 Drawing Figure

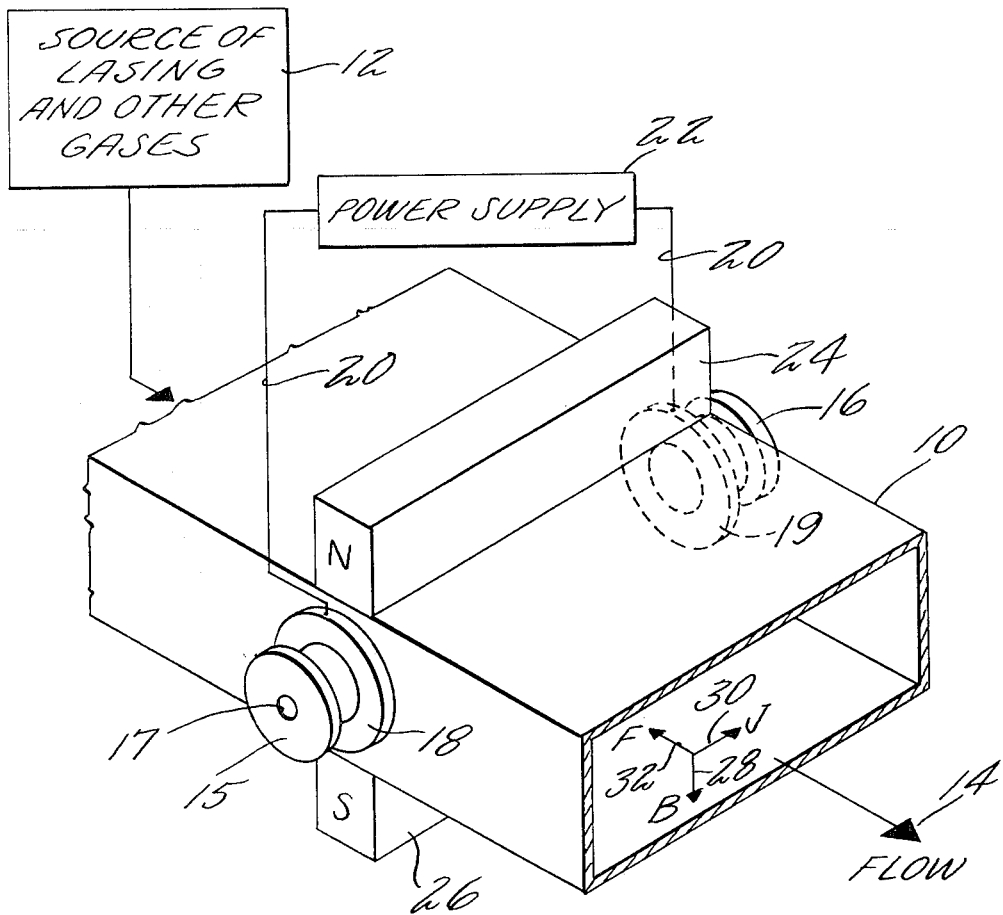

MAGNETICALLY COMPENSATED CROSS FIELD FLOWING GAS LASER

This is a continuation of application Ser. No. 877,320, filed Nov. 17, 1969 now abandoned.

BACKGROUND OF THE INVENTION

1. Field of Invention

This invention relates to flowing gas lasers, and more particularly to means for compensating the flow field effects on the electric discharge plasma thereof.

2. Description of the Prior Art

Recently, there has been a number of advances in the gas laser art. Particularly, it has become known that molecular, vibrational lasers of the flow-ing type are capable of extremely high power density, specific power and total power output. These characteristics are further enhanced in a flowing gas laser in which the optical gain region (which may be an optical cavity in the case of an oscillator, or one or more optical gain paths between suitable mirrors in the case of an amplifier) is coextensive with the electric discharge plasma within which the population inversion of the lasing gas is achieved. If the plasma extends outside of are optical gain region, the electrical efficiency and the total output power capability are decreased. Heating of the gases by the plasma is mitigated when the gas flows across the least dimension thereof. Thus, a laser with the optical gain path and plasma coextensively transverse to flow has been found to be highly desirable.

A difficulty resides in overcoming the flow field effects which the flowing gas has upon the plasma. Specifically, the plasma tends to be blown downstream, and thus out of a narrow optical gain region, or spread in an inefficient fashion across a broad optical gain region. To overcome this, compensation has been provided with RE pre-ionization means in a copending application of the same assignee entitled TRANSVERSE GAS LASER, Ser. No. 857,647, filed on Sept. 10, 1969, by Bullis and Penney. In some instances, the RF pre-ionization solution is unattractive due to the need to provide an RF power supply, and the additional weight and power consumption attendant therewith. There are, obviously, other situations in which RF pre-ionization is not perfectly suitable.

SUMMARY OF THE INVENTION

The object of the present invention is to provide improved compensation for a transverse electric discharge plasma in a flowing gas laser.

According to the present invention, a magnetic field is oriented transversely with respect to both gas flow and the E field of a cross-field electric discharge flowing gas laser. The magnetic field exerts a force on the electrons drifting from the cathode to the anode to create a force in the direction opposite to the flow of gases, thereby compensating for flow field effects which tend to blow the electric discharge plasma downstream.

The present invention is capable of simple implementation, not requiring additional power supplies or the power consumption and weight attendant therewith. The present invention may be implemented simply with permanent magnets, which are nonconsumptive.

The foregoing and other objects, features and advantages of the present invention will become more apparent in the light of the following detailed description of a preferred embodiment thereof, as illustrated in the accompanying drawing.

BRIEF DESCRIPTION OF THE DRAWING

The sole FIGURE herein comprises a simplified, schematicized, partially broken away perspective view of a flowing gas laser with magnetic flow field compensation in accordance with the present invention.

DESCRIPTION OF THE PREFERRED EMBODIMENT

Referring to the FIGURE, a flowing gas laser incorporating the present invention comprises a conduit 10 through which lasing and other gases flow from a source 12 in a direction indicated by an arrow 14. The gas mixture may typically comprise nearly equal parts of carbon dioxide, nitrogen and helium, or other ratios or mixtures known in the art. It is important to note that the particular gas mixture is not really significant to the present invention since the invention incorporates the force effect of a magnetic field on drifting electrons within an electric discharge plasma, all of which is independent of the particular gas mixture employed; even though the electron drift depends in part on the gas mixture, the magnetic field may be adjusted according.

Appended to the conduit 10 are structures which include mirrors 15, 16 to form an optical cavity, including suitable output coupling capability (such as a partially reflecting mirror or a hole 17 in one of the mirrors), as well as the anode 18 and cathode 19 necessary to establish an electric discharge plasma. The anode 18 and cathode 19 are connected by suitable electrical conductors 20 to a suitable power supply 22, all as is known in the art. Disposed above and below the region between the structures 15-19 are magnetic pole pieces 24, 26 respectively. These create a magnetic field from top to bottom as viewed in the FIGURE, and as indicated by the vector 28. The migration of electrons from the cathode to the anode result in a current vector (opposite to electron flow) in the direction from the anode 18 to the cathode 19 as shown by the vector 30.

As is known, the interaction between the current and the magnetic field will result in an upstream force as indicated by the force vector 32. This force is exerted upon the electrons, and tends to maintain the electrons in an area between the anode and cathode. However, the flow field effects on the ions are much greater than those on the electrons since the mass of the ions is several orders of magnitude greater than the mass of the electrons. But, electrical neutrality dictates that if the electrons are maintained in the area between the anode and cathode, as the ions tend to be blown downstream, there is an electrical force of attraction between them which causes the ions to remain in the same general vicinity with the electrons. Thus, the plasma established by the electric field between the anode 18 and cathode 19 is maintained in an area substantially between the pole pieces 24, 26.

The magnetic field may be created by electromagnets instead of the permanent magnets 24, 26 if desired. The downstream end of the conduit 10 may be connected to suitable exhaust means so as to vent the gases to ambient, or suitable flow means may be provided so as to create a closed-loop or closed cycle system in which the gases are recirculated continuously through the conduit 10, as is known in the art. What is important to the present invention is that the magnetic field be capable of generating a force on the electrons as a result of the J-cross-B product which is opposite to the flow of gases through the electric discharge plasma.

Typical parameters for a small, laboratory model of the present invention include a conduit having a width of six inches, a depth of one-half inch, with a flow of gases therein having a mixture of 1:3:6 $CO_2$, $N_2$ and He, respectively, at a total pressure of 25 Torr and a flow velocity of 30 M/sec. The magnetic pole pieces 24, 26 provided 300 gauss, and the electric field comprised approximately 100–150 volts per centimeter.

Although the invention has been shown and described with respect to a preferred embodiment thereof, it should be understood by those skilled in the art that the foregoing and various other changes and omissions in the form and detail thereof may be made therein without departing from the spirit and scope of the invention.

Having thus described a typical embodiment of our invention, that which we claim as new and desire to secure by Letters Patent of the United States is:

1. In a flowing gas laser of the type in which electrical power is coupled into the gas flowing through an optical gain region through electron collisions within an electric discharge plasma established in the optical gain region, an optical output power is coupled from the optical gain region, the comprising comprising:

means for establishing an optical gain region which has an optical axis therethrough;

means for providing a flow of a gas mixture including a lasing gas through said optical gain region in a direction transverse to the axis;

means for establishing an electric discharge plasma within said optical gain region, the electric field of said plasma being transverse to the flow of gases through said optical gain region; and means for establishing a magnetic field in said optical gain region, the flux lines of the magnetic field being transverse with respect to both said flow of gases and with respect to said electric field, and oriented in a direction to generate a force, on electrons in the plasma drifting from the cathode to the anode which is opposite to the direction of gas flow through said optical gain region for compensating for flow field effects which tend to blow the electric discharge plasma downstream.

2. The gas laser according to claim 1 wherein the dimension of said optical gain region in the direction of said electric field is greater than the dimension of said optical gain region in the direction of said magnetic field.

* * * * *

UNITED STATES PATENT OFFICE
CERTIFICATE OF CORRECTION

Patent No. 3,761,836          Dated September 25, 1973

Inventor(s)    EDWARD A. PINSLEY ET AL

It is certified that error appears in the above-identified patent and that said Letters Patent are hereby corrected as shown below:

| | | |
|---|---|---|
| Column 1, | line 15, | "flow-ing" should read -- flowing -- |
| | line 24, | "are" should read -- the -- |
| | line 37, | "RE" should read -- RF -- |
| Column 4, | line 1, | delete "comprising" first occurrence and insert -- combination -- |

Signed and sealed this 25th day of December 1973.

(SEAL)
Attest:

EDWARD M. FLETCHER, JR.       RENE D. TEGTMEYER
Attesting Officer              Acting Commissioner of Patents